Figure 1:
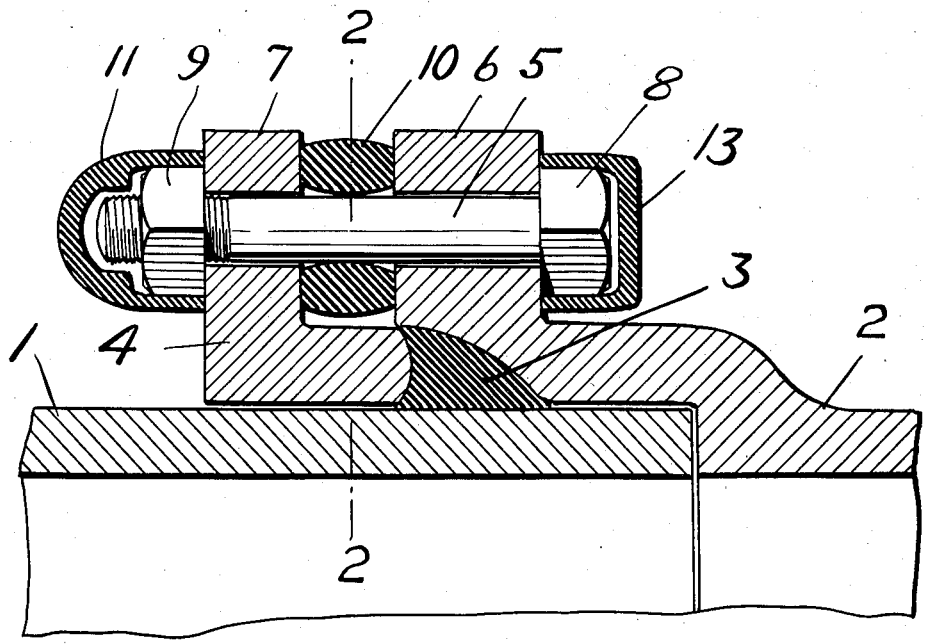

Jan. 8, 1935.       P. W. JANEWAY, JR       1,987,235
BOLTED PIPE JOINT
Filed March 8, 1934

INVENTOR
Price W. Janeway, Jr.
BY
Augustus B. Stoughton.
ATTORNEY.

WITNESS:

Patented Jan. 8, 1935

1,987,235

UNITED STATES PATENT OFFICE 1,987,235

BOLTED PIPE JOINT

Price W. Janeway, Jr., Media, Pa., assignor to The United Gas Improvement Company, Philadelphia, Pa., a corporation of Pennsylvania Application March 8, 1934, Serial No. 714,594

4 Claims. (Cl. 285—17)

The present invention relates to bolted pipe joints for underground metal piping.

It has been determined by tests that in underground metal piping subject to electrolytic corrosion and provided with bolted joints, the bolts and nuts, because of their position and surface exposure, tend to lose a disproportionate quantity of metal as compared with the remainder of the joint and joints tend to fail by corrosion of the bolts and nuts when the remainder of the joint is in relatively good condition.

The principal object of the present invention is to provide inexpensive and readily applicable means for protecting the bolts and nuts from such loss, thereby prolonging the life of the joints.

Figure 2:
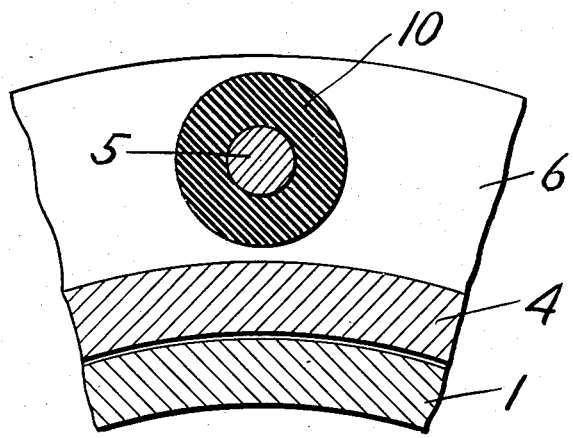

The invention will be described in connection with the drawing which forms a part of the specification and which shows a form of the invention chosen for illustration and in which:

Fig. 1 shows a cross-section of a bolted bell and spigot joint embodying a form of the invention; and Fig. 2 shows a cross-section along the line 2—2 in Fig. 1.

Referring to the drawing, 1 indicates a portion of the spigot end of a pipe section; 2 is a portion of the bell end of an adjoining section; and 3 is a rubber packing ring forced into the joint by the follower ring 4 when drawn up by bolts, one of which is shown at 5.

The bolt 5 is passed through a hole in the flange 6 of the bell and through a hole in the follower ring flange 7. 8 is the head of the bolt and 9 is the nut.

After the bolt is passed through the flange 6, and before it is passed through the follower ring flange 7, a flexible ring 10 is slipped over the bolt. This ring may be formed of easily distortable material which has qualities of electrical insulation, such as rubber or impregnated yarn rope. Soft rubber is preferable, though other materials may be used. The ring is made of such dimensions that, when the joint is drawn up, the rubber abuts and is squeezed between the inner faces of the flanges 6 and 7, forming a tight protection around the bolt between the flanges. The material of the ring should be sufficiently flexible so as not to interfere with the proper forcing of the packing ring 3 into the joint.

11 indicates a rubber nipple-like cap, shaped in cross-section similarly to the cross-section of the nut 9, but slightly smaller, and adapted to be stretched slightly and drawn on over the nut and end of the bolt, the interior cavity being deep enough to permit the nipples being driven up against the flange 7 of the follower ring. If desired, the cap may be smeared with cement before it is put on, to further secure it.

Similarly, 13 is a rubber nipple-like cap adapted to fit and be driven over the head of the bolt 8 and against the flange of the bell 6.

The invention provides for inexpensively protecting the bolts of a wide variety of bolted joints. One particular type of joint has been chosen for illustration. It is also adapted for use on leak clamps.

I do not intend to be limited save as the scope of the prior art and of the attached claims may require.

I claim:

1. A pipe joint, comprising in combination, a pipe having a spigot end, a pipe having a bell end adjacent said spigot end, a packing ring in the joint between said pipes, a follower ring compressing said packing ring, bolts connecting said bell end and said follower ring, heads on one of the ends of said bolts, nuts co-operating with screw-threads on the other of said ends of said bolts, and coverings of flexible insulating material surrounding the exposed parts of said bolts and said heads and said nuts, said coverings being retained in position in part by flexible contact with said heads and said nuts and in part by compression between said bell end and said follower ring.

2. A pipe joint in which the joint between the ends of adjacent pipes is closed by a washer and a follower ring holding said packing ring in position and headed bolts with co-operating nuts fastening said follower ring to one of said pipes and coverings of flexible insulating material on the exposed parts of said headed bolts and their nuts and held on said bolts and nuts in part by compression between said follower ring and the pipe to which said ring is connected and in part by the inherent flexibility of the coverings.

3. In a pipe joint having bolts connecting separate pipes together, caps of flexible insulating material surrounding the ends of said bolts and retained thereon by the stretch in said caps.

4. In a pipe joint having flanges including a flange on a follower ring, and having a packing ring driven in said joint by said follower ring and having bolts passing through said flanges, individual tubes of flexible insulating material surrounding said bolts between said flanges to provide a covering for those portions of said bolts extending between said flanges while offering little or no resistance to the driving of said packing ring by said follower ring.

PRICE W. JANEWAY, JR.